Feb. 13, 1923.
O. D. NUTTER.
CASING KICKER.
FILED AUG. 12, 1921.
1,445,158.
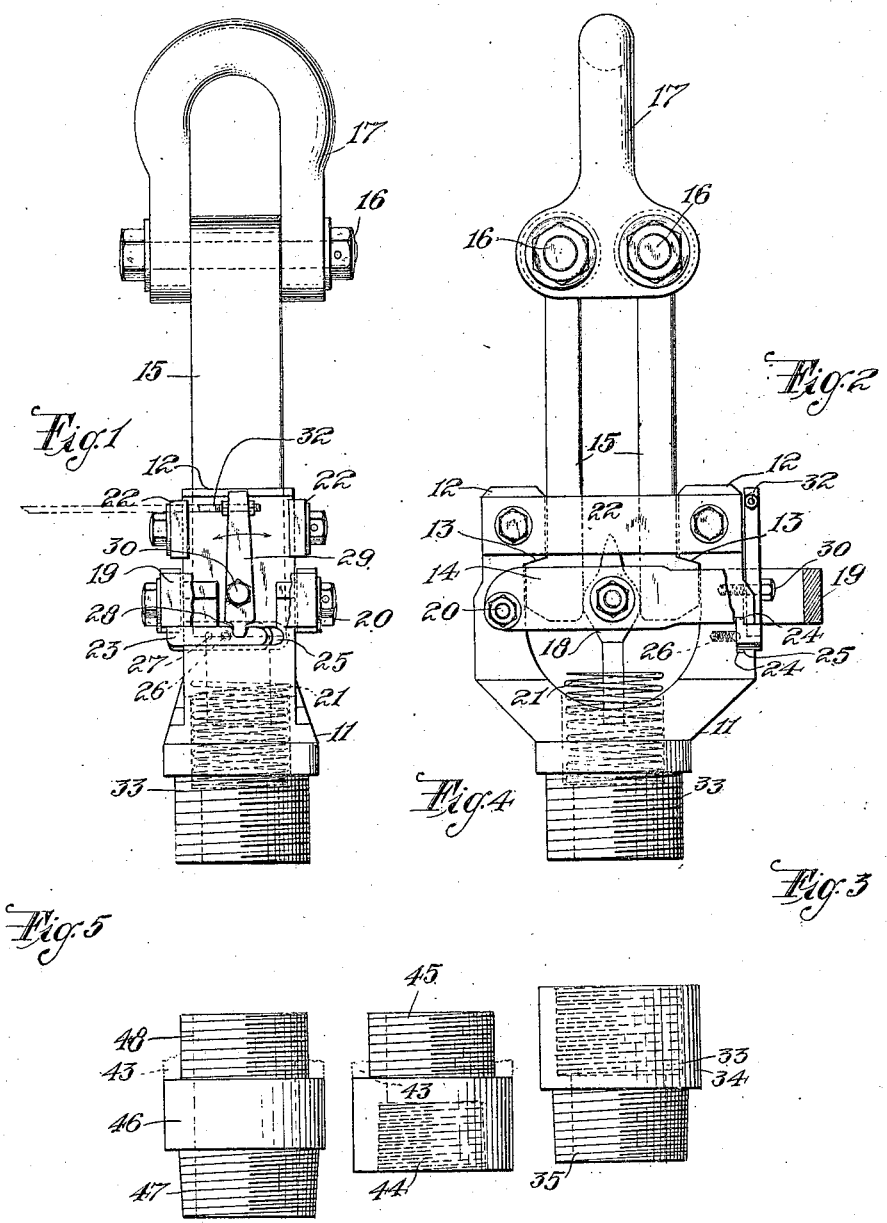
INVENTOR
ORDA D. NUTTER.
BY
Arthur Middleton
ATTORNEY Patented Feb. 13, 1923.

1,445,158

UNITED STATES PATENT OFFICE.

ORDA D. NUTTER, OF PARKERSBURG, WEST VIRGINIA, ASSIGNOR TO ACME FISHING TOOL COMPANY, OF PARKERSBURG, WEST VIRGINIA, A CORPORATION OF WEST VIRGINIA.

CASING KICKER.

Application filed August 12, 1921. Serial No. 491,855.

*To all whom it may concern:*

Be it known that I, ORDA D. NUTTER, a citizen of the United States, residing at Parkersburg, West Virginia, have invented certain new and useful Improvements in Casing Kickers, of which the following is a specification.

This invention relates to casing kickers or implements for pulling casings from oil wells and the object of the invention is to make provision for the easy release or unlocking of the grappling means whereby they can be removed from the kicker head.

The invention consists of a latch easily controlled under all circumstances and conditions for tripping the spreader to release the grappling means from the kicker head, the latch comprising a plurality of parts with the support of the spreader and its associated parts falling upon one part of the latch whereas another part of the latch bears no weight and controls the movement of the weight bearing part. The invention further consists of adapters for use in connection with casings of various sizes.

I have shown an embodiment of my invention which is the best of which I am at present informed but it is to be understood that it is used solely in an illustrative sense and therefore it should not be taken as limiting for the invention is capable of different embodiments.

In the accompanying drawings,

Figure 1 shows a side elevation of a kicker including my invention;

Figure 2 shows a side view thereof, while Figures 3, 4 and 5 show modifications.

The customary formation or construction of a casing kicker comprises a head 11 formed yoke-shaped to provide ears 12 equipped with inclined faces 13 adapted to be engaged by the feet 14 of companion arms 15. These arms are pivoted at 16 in a clevis 17 and constitute grappling means for the kicker head. To connect the arms 15 with the ears 12 of the head 11, they are lowered into position and as they enter between the ears of the head, the spreader 18 spreads them apart and as they descend further, locks them in the position shown in Fig. 2. The kicker head is provided with a bail 19 pivoted at 20, on one ear 12 of the kicker head, which has supported therein, the spreader 18.

Spring means 21 are provided to cushion the fall of the spreader 18 when it and the bail 19 move downwardly into grappling means interlocking position. The ears of the kicker head are braced by tie rods 22.

My invention consists in providing latch means for releasably holding the bail in substantially horizontal position whereby the spreader locks the grappling arms in locking position (Fig. 2) and the support of the bail 19 and spreader 18 is borne by one member of the latch means, which part comprises a substantially horizontally extending finger or block 23 having base flanges 24, adapted to slide in a groove 25 in the kicker head shaped to be complementary to the sliding block 23. The block 23 is so located in the head 11 that it slides transversely of the bail 19 so when it is in extended position (Fig. 1) it supports one leg of the bail. A spring pressed ball or catch 26, adapted to coact with a recess 27 is provided for releasably locking the block 23 in position wherein it is disengaged from the bail. A side recess or cusp 28 is provided in the block which is engaged by the work-arm of a lever 29 (forming another part of the latching means) pivoted at 30 on the kicker head, or rather on one ear or arm thereof. The power arm of the lever 29 is equipped with an eye 31 through which is adapted to pass linear means 32 whereby the lever may be oscillated from a distance such as at the top of the well.

*Operation.*

To unlock the grappling means from their locked position wherein the block 23 is extended under the bail 19 and thereby supports the bail and its spreader in a position locking the grappling arms 15 within the kicker, the lever 29 is rotated anti-clockwise, retracting the block 23 from under the bail 19 until the spring pressed catch 26 locks the block in withdrawn position. In the meantime, the bail falls about its pivot 20 with its spreader 18 until the fall of the spreader is stopped by the spring 21. Falling of the spreader permits the feet 14 of the arms 15 to fall away from the inclined faces of the ears 12 rendering the grappling arms 15 easily removable from the kicker.

To reposition the grappling arms, they are lowered into the kicker, the spreader is then raised into place between them by raising of the bail and then clockwise movement of the lever extends the block under the bail whereby the parts are locked in position as shown in Figs. 1 and 2. All the supporting strain of the bail and the spreader comes on the block 23 which is amply constructed to sustain this pressure as its flanged base withstands any turning action which may come on it and as the sliding movement of the block is at right angles to the thrust of the bail, there is no inclination to displace the block.

The kicker is provided with a threaded neck 33 adapted for attachment with the pipe or casing but in order that the same kicker may be used in connection with a number of different sized casings, I provide bushings or adapters such as are shown in Figs. 3 to 5.

In Figure 3, the bushing consists of a female internally threaded portion 34 having a male externally threaded portion 35 wherein the bushing can be applied to the kicker by screwing the bushing onto the threaded neck 33 of the kicker and then the threaded portion 35 will take a different sized casing from what the kicker would have without the bushing.

In Figure 4, the bushing there shown is just the reverse of the one shown in Fig. 3, for the female portion 44 is adapted to be screwed onto the casing whereas the male portion 45 is adapted to be attached to a female neck 43 sometimes provided on a kicker.

Or, as in the case of the kicker of Fig. 4, where it is provided with a female neck portion, the bushing or adapter may have a central tong-hold 46 with a threaded male portion 47 and 48 of different diameters extending on each side thereof. One of them (48) is adapted to enter the portion 43 of the kicker and the other (47) to engage the casing. In this way, one kicker can be adapted to be used with a variety of different sized casings which is a great advantage because these kickers are usually rented out and have to be shipped rather long distances to the well where they are to be used. It happens that a separate kicker has to be shipped to two wells which are almost side by side, due to their different sized casings, whereas, with these bushings, one kicker could be used for both wells. This not only saves freight but fewer sized kickers need be made and they are very heavy and expensive things to make.

What I claim is:

1. In combination in a casing kicker, grappling arms, spreading means for locking the arms in engagement with the kicker, a pivoted carrier for the spreading means, an extensible support for maintaining the carrier and spreading means in locking position, a means for controlling the support.

2. The apparatus of claim 1 in which the extensible means has a sliding block.

3. The apparatus of claim 1 in which the extensible means has a flanged slidable block.

4. The apparatus of claim 1 in which the extensible means has a flanged slidable block slidable in a groove in the kicker complementary to the kicker.

5. The apparatus of claim 1 in which the control means has a lever.

6. The apparatus of claim 1 in which the extensible support has a horizontally slidable block, and the control means has a lever for reciprocating the block.

7. The apparatus of claim 1 in which the extensible support has a recessed slidable block, and the control means has a headed lever for reciprocating the block, the head of the lever entering the recess in the block.

8. The apparatus of claim 1 in which the spreader carrier has a bail, and the control means are positioned between the legs of the bail.

In testimony whereof I have affixed my signature to this specification.

ORDA D. NUTTER.